US012188510B1

(12) United States Patent
Hess et al.

(10) Patent No.: US 12,188,510 B1
(45) Date of Patent: Jan. 7, 2025

(54) NUT PLATE ASSEMBLY INCLUDING TILTABLE FLOATING NUT WITH CURVED INTERFACE

(71) Applicant: Enduralock, LLC, Lenexa, KS (US)

(72) Inventors: Harold Hess, Leawood, KS (US); Deeptesh Selvaraj, Pitt Meadows (CA); Caleb Grabill, Olathe, KS (US); Zoltan Szekely, Cypress, TX (US); Armando Perez, III, Los Angeles, CA (US)

(73) Assignee: Enduralock, LLC, Lenexa, KS (US)

( * ) Notice: Subject to any disclaimer, the term of this patent is extended or adjusted under 35 U.S.C. 154(b) by 0 days.

(21) Appl. No.: 18/210,031

(22) Filed: Jun. 14, 2023

(51) Int. Cl.
*F16B 37/04* (2006.01)
*F16B 5/02* (2006.01)

(52) U.S. Cl.
CPC ............ *F16B 37/044* (2013.01); *F16B 5/025* (2013.01)

(58) Field of Classification Search
CPC .............................. F16B 37/044; F16B 5/025
USPC .................................. 411/111–112, 380, 537
See application file for complete search history.

(56) References Cited

U.S. PATENT DOCUMENTS

| | | | |
|---|---|---|---|
| 2,353,252 A | 7/1944 | Leisure | |
| 2,385,851 A | 10/1945 | Swanstrom | |
| 2,737,222 A | 3/1956 | Becker | |
| 2,820,499 A | 1/1958 | Schaaf | |
| 2,991,816 A | 7/1961 | Harbison et al. | |
| 3,020,946 A * | 2/1962 | Mills | F16B 37/044 411/85 |
| 3,093,222 A | 6/1963 | Christoffersen et al. | |
| 3,160,187 A | 12/1964 | Zahodiakin | |
| 3,219,086 A | 11/1965 | Zahodiakin | |
| 3,318,622 A * | 5/1967 | Crumpler | F16B 5/0266 411/386 |
| 3,386,771 A * | 6/1968 | Verdier | B60B 3/16 411/533 |
| 3,426,816 A | 2/1969 | McIntire, Jr. et al. | |
| 3,695,324 A | 10/1972 | Gulistan | |
| 4,191,236 A | 3/1980 | Duran | |
| 4,227,561 A | 10/1980 | Molina | |
| 4,692,075 A | 9/1987 | Metz | |

(Continued)

FOREIGN PATENT DOCUMENTS

| | | |
|---|---|---|
| CN | 109505849 A | 3/2019 |
| EP | 3032119 B1 | 2/2019 |
| KR | 20140046297 A | 4/2014 |

OTHER PUBLICATIONS

International Search Report and Written Opinion for corresponding PCT/US2018/019325 mailed May 2, 2018, 9 pages.

(Continued)

*Primary Examiner* — Sarang Afzali
*Assistant Examiner* — Darrell C Ford
(74) *Attorney, Agent, or Firm* — Armstrong Teasdale LLP

(57) ABSTRACT

A nut plate assembly includes a plate comprising an aperture defined therethrough, and a shell attached to the plate and extending along a center axis. The shell includes a first end and a second end. The nut plate also includes a nut disposed within the shell. The nut is moveable between a first position proximate the first end of the shell and a second position proximate the second end of the shell. The nut includes a first curved engagement surface and is tiltable relative to the center axis when the nut is retained within the shell.

20 Claims, 14 Drawing Sheets

(56) References Cited

U.S. PATENT DOCUMENTS

| | | |
|---|---|---|
| 4,863,326 A | 9/1989 | Vickers |
| 4,875,816 A | 10/1989 | Peterson |
| 4,917,553 A | 4/1990 | Muller |
| 5,146,668 A | 9/1992 | Gulistan |
| 5,489,173 A | 2/1996 | Hofle |
| 5,716,178 A | 2/1998 | Vu |
| 5,730,540 A | 3/1998 | Duran et al. |
| 6,183,180 B1 | 2/2001 | Copple et al. |
| 7,101,135 B2 * | 9/2006 | Hassed ................ F16B 5/0216 411/432 |
| 7,544,028 B2 | 6/2009 | Tournier et al. |
| 7,698,798 B2 | 4/2010 | Toosky |
| 7,802,952 B2 | 9/2010 | Toosky et al. |
| 8,177,466 B2 | 5/2012 | Csik et al. |
| 8,277,158 B2 | 10/2012 | Csik et al. |
| 8,579,569 B2 | 11/2013 | Schendel |
| 8,647,035 B2 | 2/2014 | Bakken et al. |
| 9,033,632 B2 | 5/2015 | Komsitsky et al. |
| 9,114,449 B2 | 8/2015 | Ross et al. |
| 9,140,290 B2 | 9/2015 | Damm |
| 9,360,039 B2 | 6/2016 | Endt et al. |
| 9,435,369 B2 | 9/2016 | Deck |
| 10,677,280 B2 | 6/2020 | Hess et al. |
| 10,753,383 B2 | 8/2020 | Hess et al. |
| 2003/0147715 A1 | 8/2003 | Curley, Jr. et al. |
| 2004/0013495 A1 * | 1/2004 | Hassed ................ F16B 5/0216 411/537 |
| 2007/0009342 A1 * | 1/2007 | Figge .................... F16B 5/025 411/546 |
| 2018/0252256 A1 * | 9/2018 | Hess .................. F16B 37/044 |
| 2018/0252257 A1 * | 9/2018 | Hess .................. F16B 37/044 |
| 2022/0235812 A1 | 7/2022 | Hess et al. |

OTHER PUBLICATIONS

International Search Report and Written Opinion for corresponding PCT/US2022/013456 mailed Apr. 14, 2022, 6 pages.

European Search Report issued in European Application No. 24179887.5 dated Nov. 4, 2024, pp. 1-13.

* cited by examiner

NUT PLATE ASSEMBLY INCLUDING TILTABLE FLOATING NUT WITH CURVED INTERFACE

BACKGROUND

The field of the disclosure relates generally to nut plates, and more specifically to nut plate assemblies including a tiltable floating nut with a curved interface.

At least some known floating nut plates include a base or bottom plate with an opening. The nut plates support a nut or similar fastener element that is captured on the base by a retainer or cage component. Such nut plates facilitate holding components, for example panels, together when a fastener is threadably engaged with the nut and tightened, while still enabling some movement between the components. In such known nut plates, the nut receives a fastener, such as a bolt, screw, or other threaded component element passed through an opening in the components and threaded into the nut. The opening in the component may be sized to enable the nut and fastener to move laterally to accommodate some movement between the fastened components. However, the floating nut plates may not provide sufficient tolerances or account for misalignment of the fastener and the floating nut plate.

At least some known floating nut plates may be used in the aerospace industry. In aerospace applications, the types and numbers of fasteners for a panel assembly can be significant. Some panel fasteners for a particular panel assembly may have different lengths, while otherwise looking similar to other panel fasteners. When the panel assembly is removed, a user may typically place all the panel fasteners in a separate location to keep from misplacing the fasteners. However, when replacing the panel assembly, the user may inadvertently use an incorrect length fastener for a particular panel fastener location. This can lead to an improperly attached panel assembly.

Typically, floating nut plates are used to connect panels with parallel surfaces together. Sometimes, however, panels have surfaces that are not parallel to each other and at least some known floating nut plates cannot properly secure panels with non-parallel surfaces together.

BRIEF DESCRIPTION

In one aspect, a nut plate assembly includes a plate comprising an aperture defined therethrough, and a shell attached to the plate and extending along a center axis. The shell includes a first end and a second end. The nut plate also includes a bias member disposed within the shell, a nut disposed within the shell, and a retention washer positioned to retain the nut within the shell. The nut is moveable between a first position proximate the first end of the shell and a second position proximate the second end of the shell. The bias member is positioned to bias the nut toward one of the first position and the second position. The nut includes a first curved engagement surface, and the retention washer includes a second curved engagement surface that receives the first curved engagement surface of the nut. The first curved engagement surface of the nut and the second curved engagement surface of the retention washer form a curved interface. The nut is tiltable relative to the center axis when the nut is retained within the shell by the retention washer.

In another aspect, a method of assembling a nut plate assembly includes positioning a bias member and a nut within a shell. The shell extends along a center axis and has a first end joined to a plate and a second end opposite the first end. The plate includes an aperture defined therethrough. The nut includes a shoulder portion configured to receive a portion of the bias member. The nut is moveable between a first position proximate the shell first end and a second position proximate the shell second end. The bias member is positioned to bias the nut toward one of the first position and the second position. The method also includes coupling a retention washer to at least one of the shell and the plate to retain the nut within the shell, and engaging a first curved engagement surface of the nut with a second curved engagement surface of the retention washer. The first curved engagement surface of the nut and the second curved engagement surface of the retention washer form a curved interface. The nut is tiltable relative to the center axis when the nut is retained within the shell by the retention washer.

In yet another aspect, a fastener assembly includes a plate comprising an aperture defined therethrough, a shell attached to the plate and extending along a center axis, and a nut retained within the shell. The nut includes a first curved engagement surface. The fastener assembly also includes a fastener extending through the plate and the nut. The fastener is threadably engageable with the nut. The nut is tiltable within the shell and relative to the center axis to engage the fastener if the fastener extends at an angle relative to the center axis.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
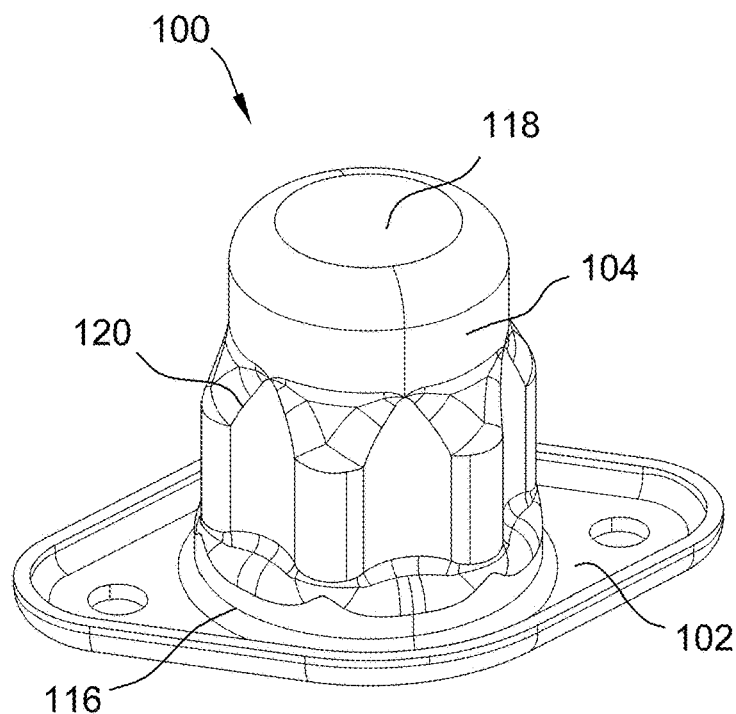
FIG. 1 is a perspective view of a nut plate assembly.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Relative descriptors used herein such as upward, downward, left, right, up, down, length, height, width, thickness, and the like are with reference to the figures, and not meant in a limiting sense. Additionally, the illustrated embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed fastener assemblies. Additionally, the shapes and sizes of components are also exemplary and can be altered without materially affecting or limiting the disclosed technology.

The nut plate assemblies described herein overcome many of the problems associated with nut plate assemblies. In general, nut plate assemblies are used to fixedly connect panels to structures in a variety of applications such as, without limitation, aerospace applications, industrial applications, and building applications, where access to both sides of the nut plate assembly is limited or restricted. Among other features and benefits, the disclosed nut plate assemblies facilitate one or more of the use of captive panel fasteners having varying lengths, quick and easy installation and/or removal of panel fasteners, and/or single end access for blind fastening applications. In addition, nut plate assemblies described herein can secure surfaces together that are not necessarily parallel to each other or even. The advantages, and other features of the technology disclosed herein, will become more readily apparent to those having ordinary skill in the art from the following detailed description of certain preferred embodiments taken in conjunction with the drawings.

Figure 2:
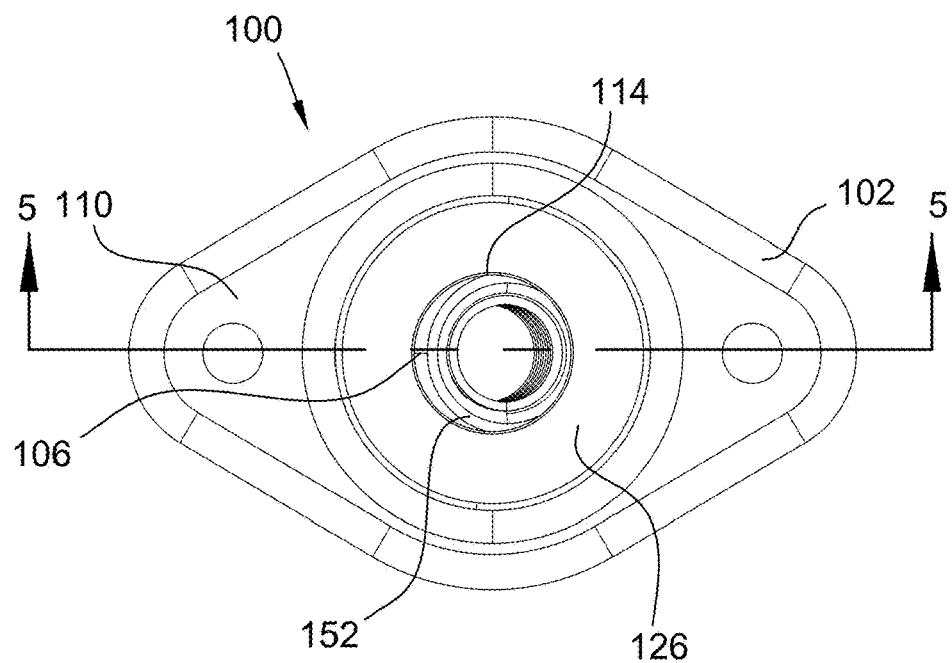
FIG. 2 is a bottom view of the nut plate assembly.
Figure 3:
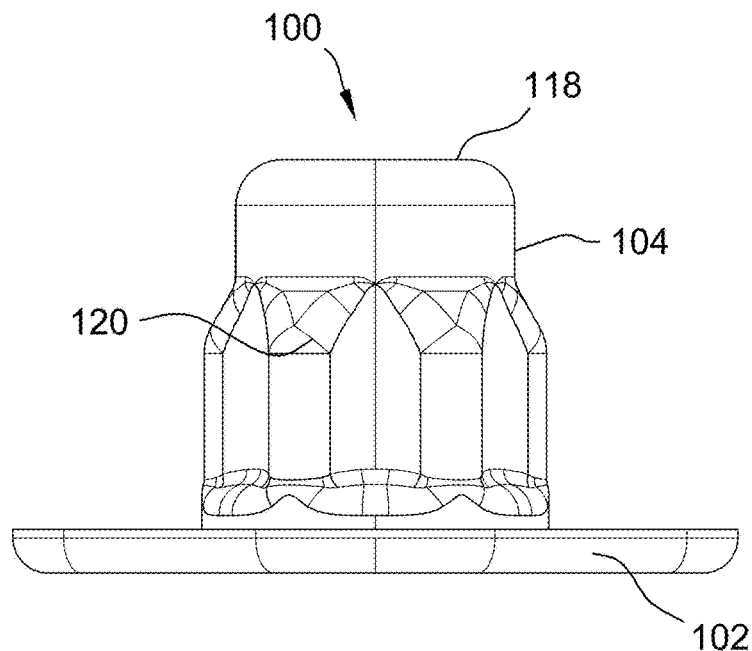
FIG. 3 is a side view of the nut plate assembly.
Figure 4:
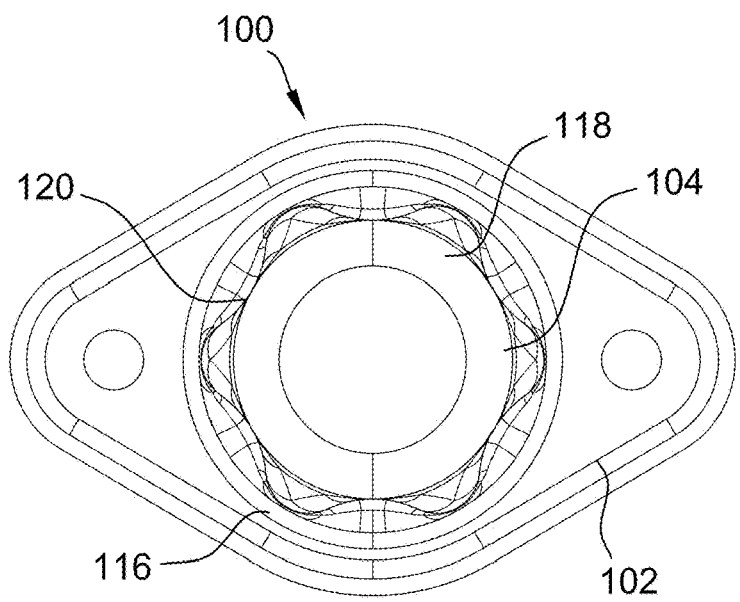
FIG. 4 is a top view of the nut plate assembly.
Figure 5:
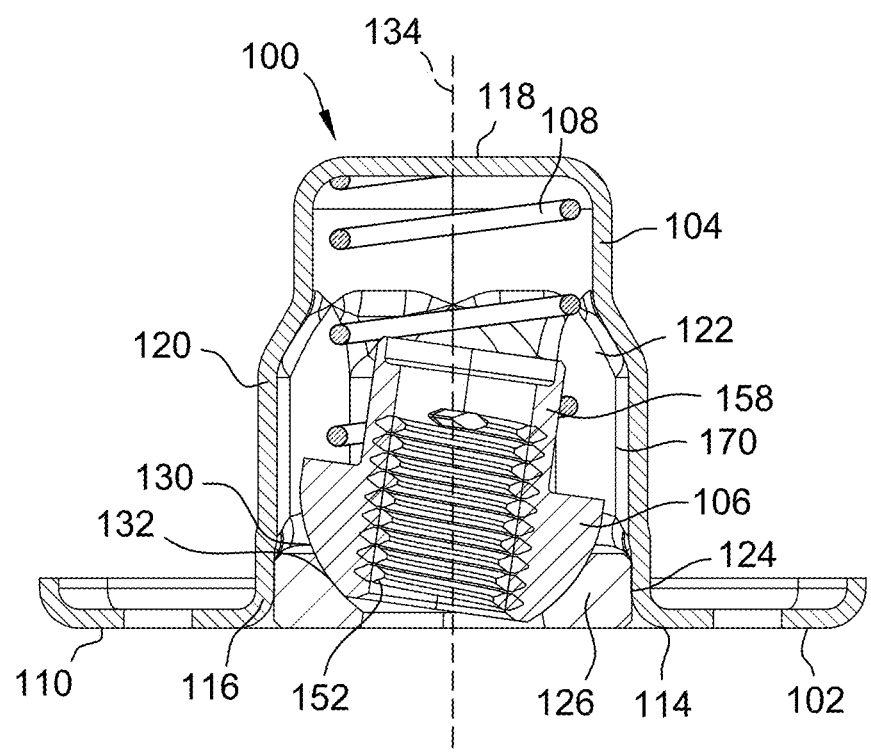
FIG. 5 is a cross-sectional view of the nut plate assembly, taken along line 5-5 shown in FIG. 2.

FIG. 1 is a perspective view of a nut plate assembly 100. FIG. 2 is a bottom view of the nut plate assembly 100. FIG. 3 is a side view of the nut plate assembly 100. FIG. 4 is a top view of the nut plate assembly 100. FIG. 5 is a cross-sectional view of the nut plate assembly 100, taken about line A-A shown in FIG. 4. In the example, the nut plate assembly 100 includes a plate 102, a shell 104, a floating nut, broadly a nut, 106, and a bias member 108. The plate 102 includes a wall 110. The wall 110 defines an aperture 114 for receiving a fastener (e.g., fastener 164 shown in FIG. 18).

Referring to FIG. 5, in the example, the nut plate assembly 100 is configured to retain both the floating nut 106 and the bias member 108 within the shell 104, which allows for the nut plate assembly 100 to be used as an inseparable assembly. In addition, during use, the nut plate assembly 100 requires no access from the nut side of nut plate assembly 100, which is advantageous for use with panels and other structure where access to both sides of nut plate assembly 100 is limited.

With reference to FIGS. 1-5, the shell 104 includes a first end 116, a second end 118, and a sidewall 120. The sidewall 120 defines a cavity 122 and an opening 124 at the first end 116. The shell 104 is joined to the plate 102 at the first end 116 such that the sidewall 120 extends outward from the plate 102. In the example, the shell 104 is integrally formed with or permanently affixed to the plate 102 such that the shell 104 and the plate 102 cannot be separated without damaging the nut plate assembly 100. In another example, the nut plate assembly 100 includes retention tabs or other coupling mechanisms to secure the shell 104 to the plate 102 and the shell 104 may be removable from the plate 102. For example, in some embodiments, the nut plate assembly 100 includes, without limitation, a spring, a hinge, a fastener, a clamp, and adhesive. In further embodiments, the retention washer 126 is flexible and is configured to move between a first position and a second position.

The sidewall 120 of the shell 104 is shaped to enclose and retain the floating nut 106 on the plate 102. For example, at the first end 116, the sidewall 120 is perpendicular to a plane of the plate 102. At the second end 118, the sidewall 120 tapers radially inward, e.g., by a swaging process, to a closed end to facilitate retaining the floating nut 106 within the shell 104 when the shell 104 is coupled to the plate 102.

As seen in FIGS. 2 and 5, the nut plate assembly 100 includes a retention washer 126 that secures the floating nut 106 within the shell 104. For example, the retention washer 126 is positioned at least partly within the cavity 122 of the shell 104 and is arranged to engage the floating nut 106. In the example, the retention washer 126 may be press-fit into the cavity of the shell 104. In other examples, the retention washer 126 is joined or coupled to the shell 104. For example, in some embodiments, the retention washer 126 includes, without limitation, a spring, a hinge, a fastener, a clamp, and adhesive. In further embodiments, the retention washer 126 is omitted and the floating nut 106 is retained by the shell 104, the plate 102, and/or a panel surface.

As described further herein, the floating nut 106 and the retention washer 126 engage each other and form a curved engagement interface. For example, the floating nut 106 and the retention washer 126 engage along curved engagement surfaces 130, 132. As a result, the floating nut 106 is able to pivot or tilt relative to the retention washer 126 and the shell 104 and realign to the appropriate angle to engage a bolt along a centerline axis of the bolt. The curved interface facilitates the nut plate assembly 100 securing non-parallel or uneven surfaces together. For example, the floating nut 106 is able to move along the curved interface to engage a fastener that extends at an angle relative to a center axis 134.

Also, in the example, the floating nut 106 is disposed within the shell 104 and is moveable relative to the sidewall 120. For example, the floating nut 106 is moveable along the center axis 134 of the shell 104 between a first position and a second position. In the first position, the floating nut 106 is proximate the first end 116. In the second position, the floating nut 106 is proximate the second end 118. In another example, the floating nut 106 is moveable between a first position proximate the second end 118 and a second position proximate the first end 116. In addition, in the illustrated example, the floating nut 106 is supported by the retention washer 126 at a curved interface and the floating nut 106 is tiltable about the center axis 134. Accordingly, in the example, the floating nut 106 is free to move in at least two directions when the floating nut 106 is secured within the cavity 122 of the shell 104. For example, the floating nut 106 is free to rotate about the center axis 134 and to tilt at an angle relative to the center axis 134. The freedom of movement of the floating nut 106 facilitates the floating nut 106 accommodating misalignment of a fastener and the nut plate assembly 100 and/or joining panels with surfaces that are not parallel.

Figure 16:
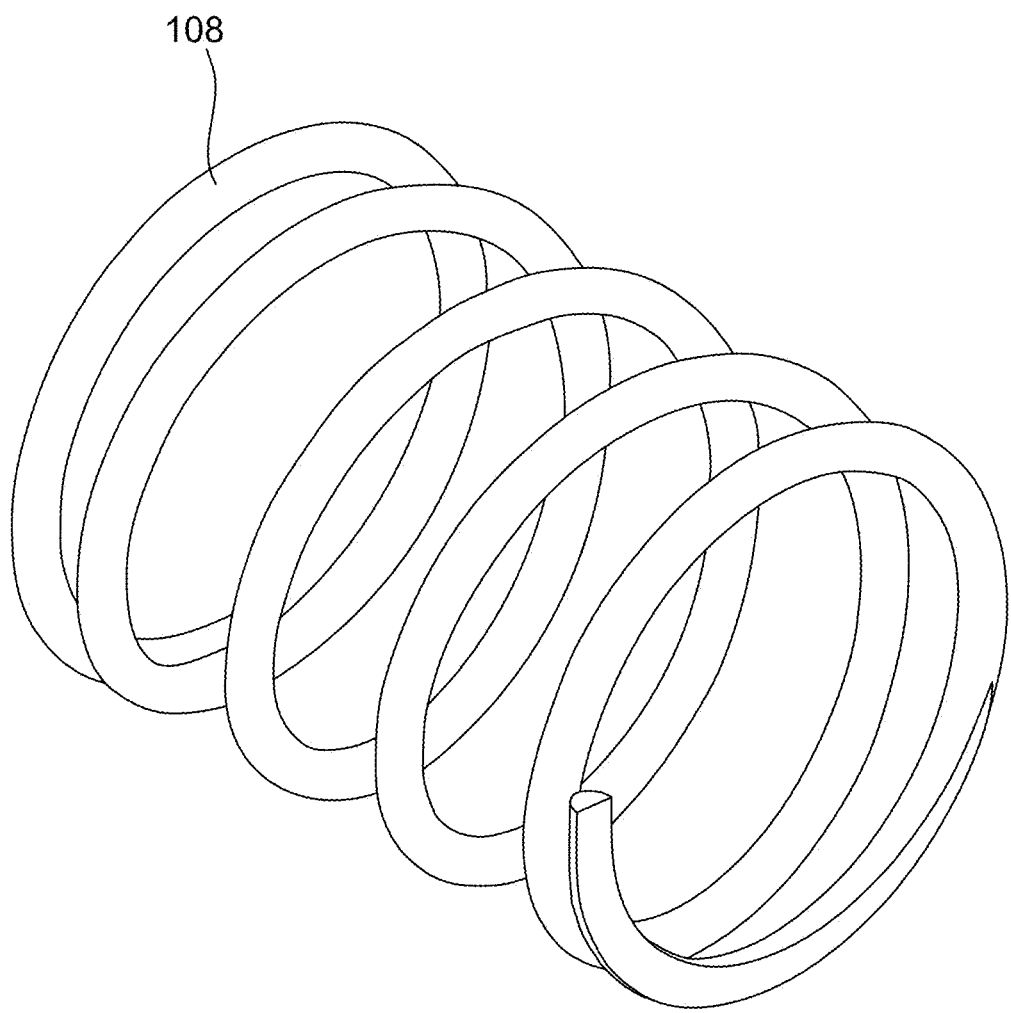
FIG. 16 is a perspective view of a bias member of the nut plate assembly.

In the example, the bias member 108 is positioned within the shell 104 and between the floating nut 106 and the second end 118 of the shell 104. As such, the bias member 108 biases the floating nut 106 axially toward the plate 102 and towards the first position. During use of the nut plate assembly 100, the bias member 108 facilitates the floating nut 106 engaging the fastener 164 (shown in FIG. 18). In the example, the bias member 108 is a compression spring, as shown in FIG. 16. Alternatively, the bias member 108 may be any type of bias or force provider that enables nut plate assembly 100 to function as described herein. In some examples, the bias member 108 provides a pre-load force on the floating nut 106 and the pre-load force on the floating nut 106 may be adjusted by varying the wire diameter and spring length of the bias member 108. In the example, the wire diameter and spring length of bias member 108 is selected to provide the necessary pre-load required for operation of nut plate assembly 100, while maintaining the bias member 108 in an axial resiliency range.

Figure 6:
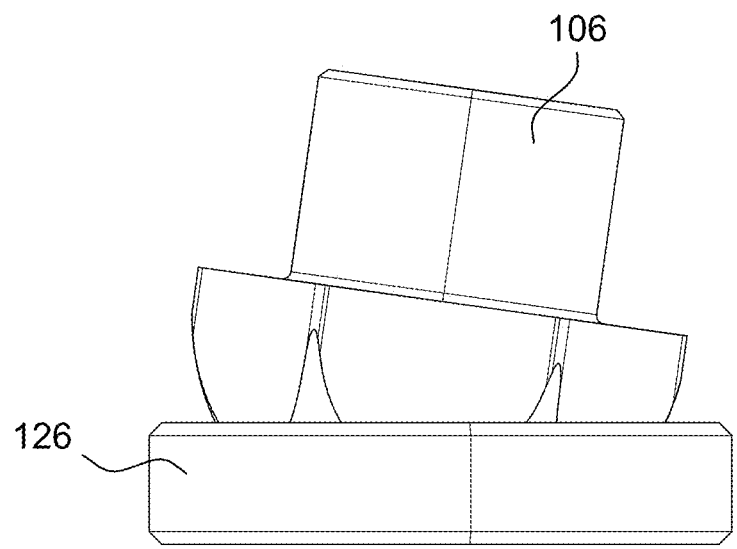
FIG. 6 is a side view of a floating nut and a retainer of the nut plate assembly.
Figure 7:
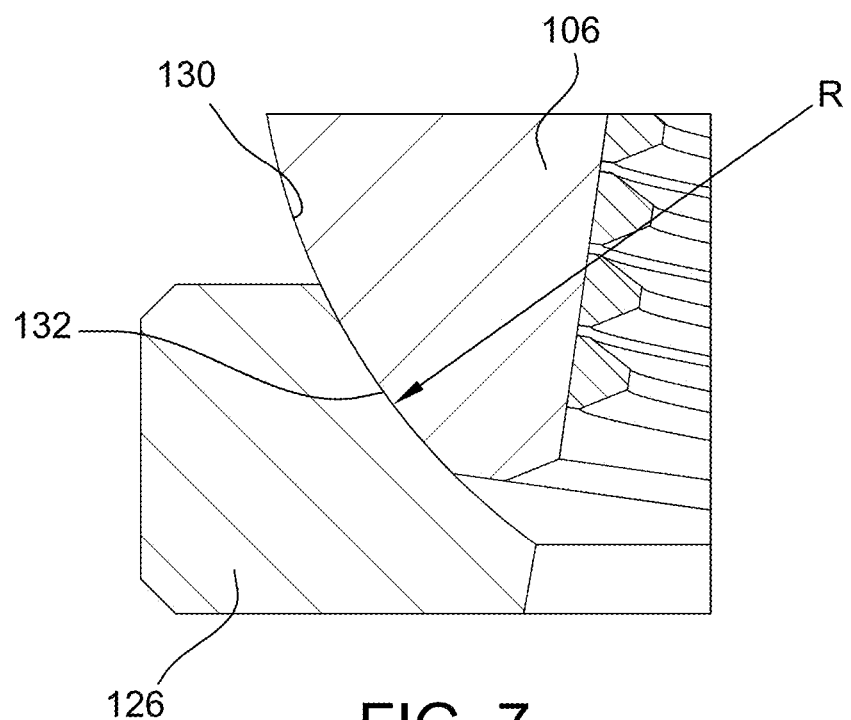
FIG. 7 is an enlarged sectional view of a portion of the nut plate assembly, illustrating a curved interface of the nut plate assembly.

Referring to FIGS. 5-7, the floating nut 106 has a first curved engagement surface 130 and the retention washer 126 has a second curved engagement surface 132. The first curved engagement surface 130 and the second curved engagement surface 132 are arranged and shaped to movably engage each other. For example, the second curved engagement surface 132 of the retention washer 126 is concave and forms a bowl. The first curved engagement surface 130 of the floating nut 106 is convex and defines a spherical shape of the floating nut 106. The first curved engagement surface 130 is received by and slides along the second curved engagement surface 132. The first curved engagement surface 130 and the second curved engagement surface 132 are smooth and free of any protuberances or surface features to facilitate sliding engagement of the surfaces. The shapes of the first curved engagement surface 130 and the second curved engagement surface facilitate the floating nut 106 sliding along the second curved engagement surface 132 and pivoting within the shell 104. The first curved engagement surface 130 has a height measured along the center axis 134 that is greater than a thickness of the retention washer 126. Accordingly, the first curved engagement surface 130 is configured to directly contact and engage substantially the entirety of the second curved engagement surface 132.

In the example, the first curved engagement surface 130 of the floating nut 106 and the second curved engagement surface 132 of the retention washer 126 each have a radius R. The second curved engagement surface 132 of the retention washer 126 has a radius that is equal to or greater than the radius of the first curved engagement surface 130 of the floating nut 106. In the example, the radius of the second curved engagement surface 132 is greater than the radius of the first curved engagement surface 130. The shape of the surfaces 130, 132 facilitate the first curved engagement surface 130 having freedom of movement relative to the second curved engagement surface 132 while ensuring that the floating nut 106 is adequately supported and retained by the retention washer 126.

Figure 8:
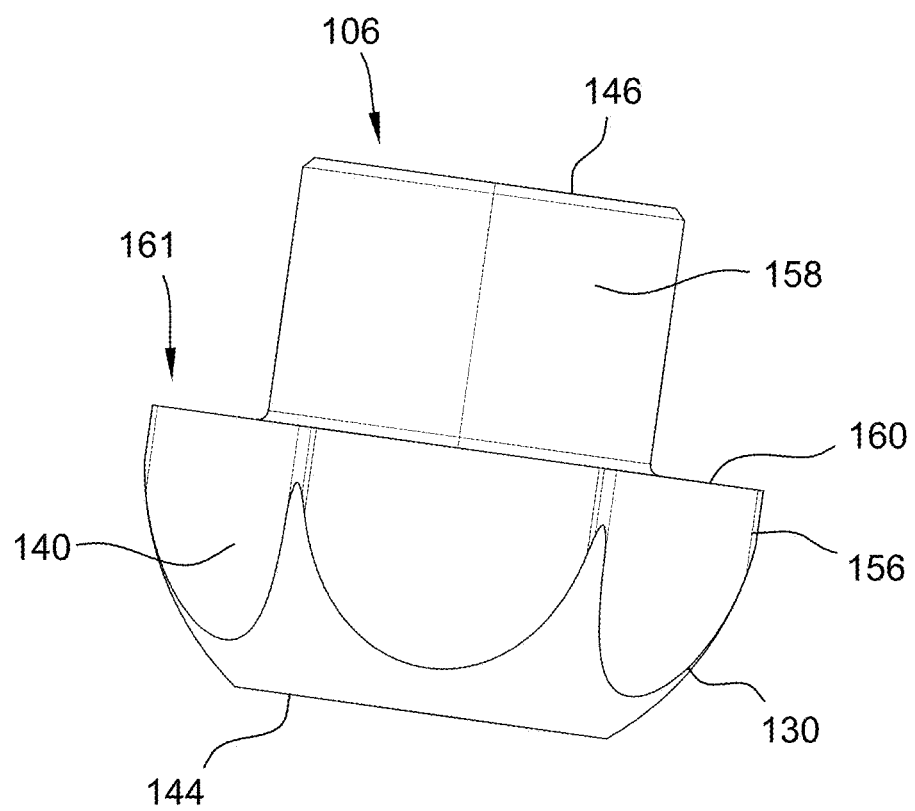
FIG. 8 is a side view of the floating nut of the nut plate assembly.
Figure 9:
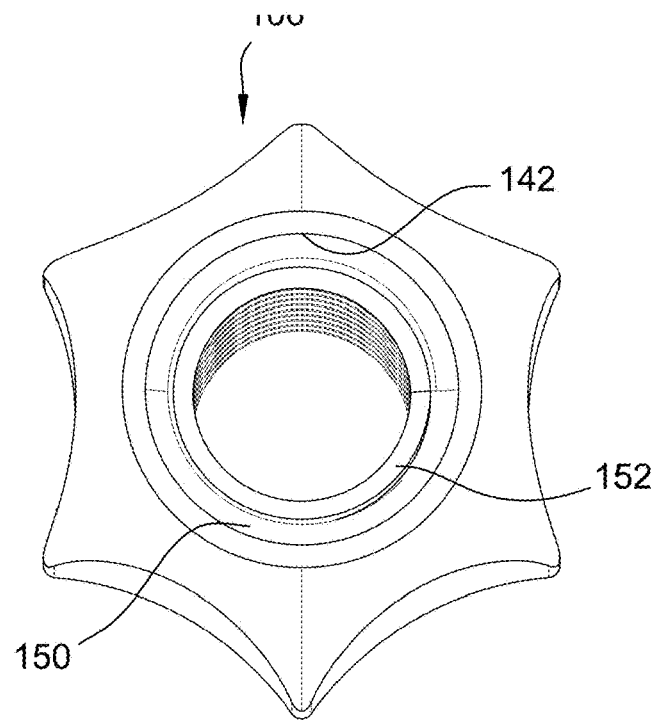
FIG. 9 is a lower perspective view of the floating nut.
Figure 10:
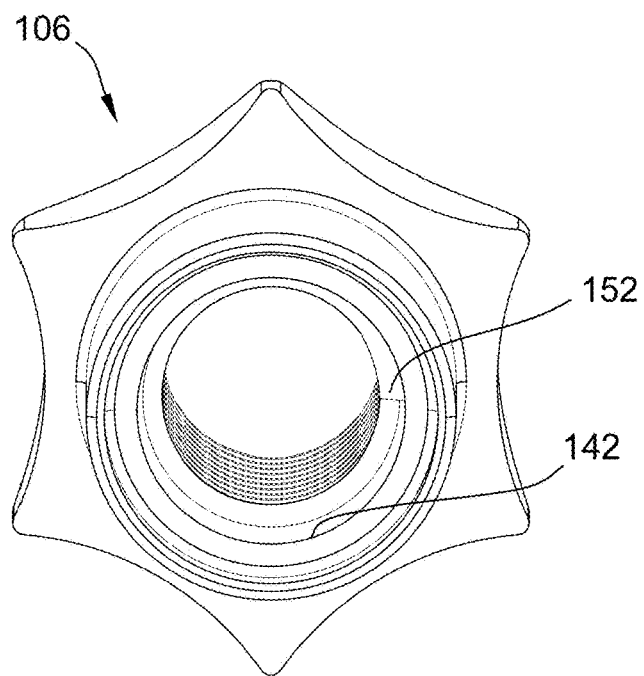
FIG. 10 is an upper perspective view of the floating nut.
Figure 15:
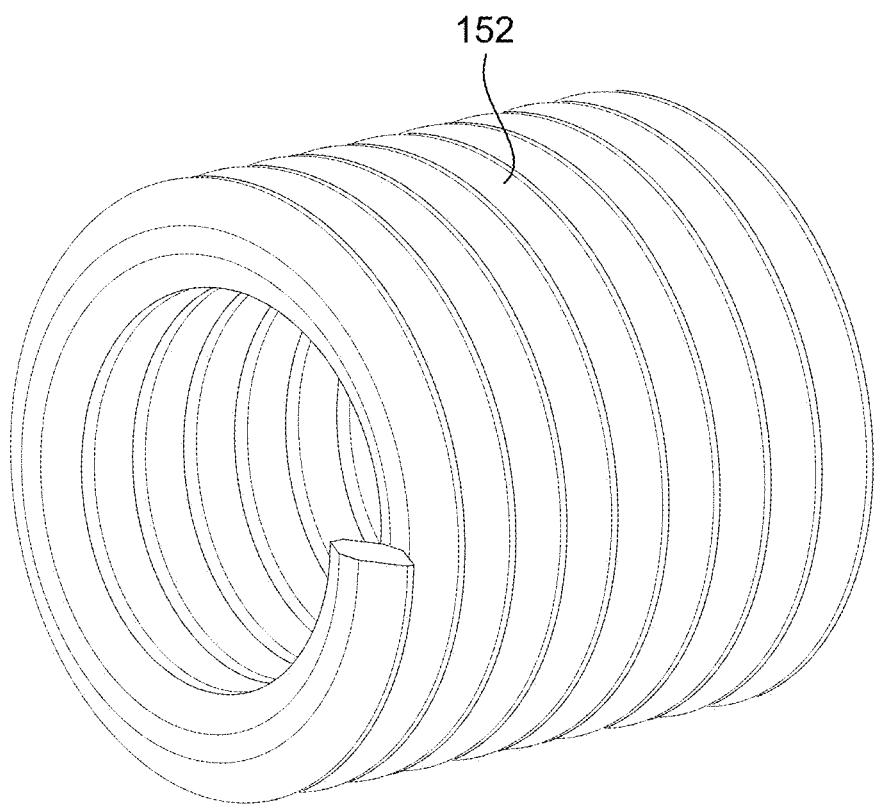
FIG. 15 is a perspective view of a threaded insert for use with the nut plate assembly.

With reference, to FIGS. 8-10, the floating nut 106 has a body 140 that defines a bore 142 therethrough. The body 140 includes a first end 144 and a second end 146. The bore 142 extends between and through the first end 144 and the second end 146 of the body 140. At the first end 144 of the body 140, the bore 142 includes a tapered portion configured to facilitate aligning a fastener (not shown in FIGS. 4-6) with the body 140. At the second end 146 of the body 140, the bore 142 includes a counter bored portion 150. The nut plate assembly 100 includes a threaded insert 152 (shown in FIG. 15) positioned in the bore 142 and extending between the tapered portion and the counter bored portion 150 for threadably coupling to a fastener during use of nut plate assembly 100. The threaded insert 152 forms a female threaded portion. In another example, the threaded insert 152 is not required and threads are formed in or otherwise coupled to an interior surface of the bore 142. In the example, the counter bored portion 150 functions as a way to control a length of the threaded insert 152 to facilitate maintaining a thread engagement length to about one times the thread diameter, while allowing the fastener to extend through threaded insert 152. In addition, the counter bored portion 150 facilitates fabricating the body 140 with a shoulder portion 158 having a length sufficient to prevent over-stressing and/or damaging bias member 108 while maintaining a thread engagement length to about one times the thread diameter.

In the example, the floating nut 106 includes the shoulder portion 158 extending from the second end 146 axially along the center axis 134 a predetermined distance that facilitates preventing over-stressing and/or damaging the bias member 108 when the bias member 108 is compressed, while enabling the bias member 108 to urge the body 140 away from the plate 102 when extended. In the example, the shoulder portion 158 extends from the second end 146 to a bearing surface 160 that receives the bias member 108. The shoulder portion 158 has a diameter that is smaller than the diameter of the outer surface 156 of the body 140. In particular, the shoulder portion 158 has a diameter configured to enable bias member 108 to slide onto shoulder portion 158, as shown in FIG. 5. The bearing surface 160 extends radially outward from the shoulder portion 158 and forms a step 161 on the body 140 up to the larger diameter of the outer surface 156 of the body 140. The shoulder portion 158 and the bearing surface 160 enable the bias member 108 to apply an axial force to the body 140 to urge the body 140 toward the plate 102.

The first curved engagement surface 130 is arranged to engage the retention washer 126 (shown in FIG. 5) when the floating nut 106 is secured in the shell 104 (shown in FIG.

5). For example, the first curved engagement surface 130 extends from the first end 144 of the floating nut 106 toward the shoulder portion 158 and around the entire circumference of the body 140. In the illustrated example, the first curved engagement surface 130 extends along a majority of the body 140. In some examples, the first curved engagement surface 130 extends along the entirety of the body 140.

In one example, the floating nut 106 is a single piece and the first curved engagement surface 130 and the shoulder portion 158 are integrally formed. In another example, the floating nut 106 includes at least two pieces. For example, the first curved engagement surface 130 may be disposed on an intermediate washer or other member that is coupled to body 140 of the floating nut 106. The body 140 may have surfaces that engage the intermediate washer and fix the body 140 and the washer with the first curved engagement surface 130 to rotate and move together.

Figure 11:
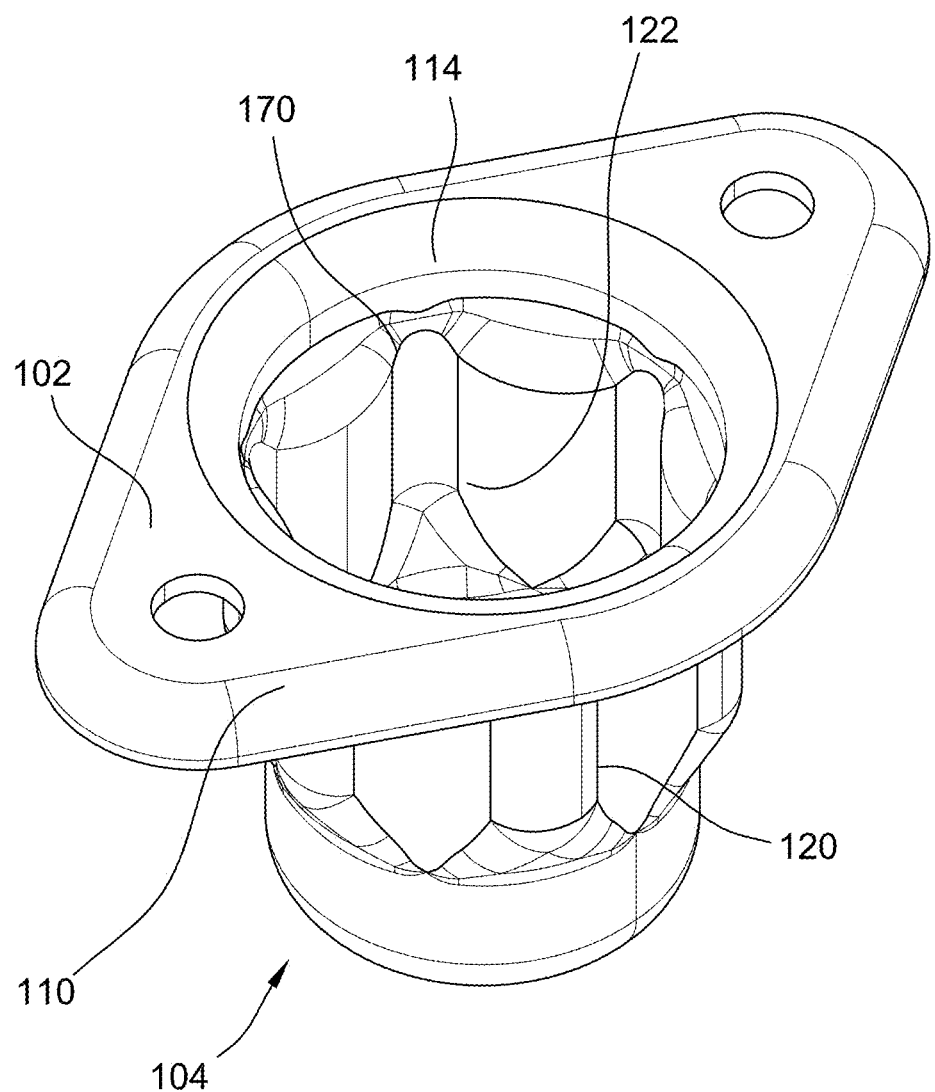
FIG. 11 is a perspective view of a shell of the nut plate assembly.

As seen in FIGS. 5 and 11, in the example, the sidewall 120 of the shell 104 defines a cross-sectional shape of the shell 104 and is configured to engage the floating nut 106. The shell 104 and the floating nut 106 define a gap therebetween that is sized to allow axial movement of the floating nut 106 and prevent rotation of the floating nut 106 relative to the shell 104. For example, the gap between the floating nut 106 and the shell 104 is less than the width of a planar surface (e.g., a planar portion of the outer surface 156 of the body 140) of the floating nut 106. Accordingly, the sidewall 120 of the shell 104 engages the floating nut 106 to inhibit rotation of the floating nut 106 when the floating nut 106 is positioned within the shell 104. In the example, the cross-sectional shape of the shell 104 is a hexagon. The shell 104 may be other shapes without departing from some aspects of the disclosure. For example, in some examples, the shell 104 includes, without limitation, a triangle, a rectangle, a trapezoid, a pentagon, a hexagon, a heptagon, an octagon, a nonagon, a decagon, a dodecagon, and a star.

In addition, the shell 104 has a plurality of grooves 170 spaced about the center axis 134. Each groove 170 receives a portion of the floating nut 106 (e.g., a planar portion of the outer surface 156 of the body 140) when the floating nut 106 is in the first position within the shell 104. The grooves 170 act as engagement features that engage the floating nut 106 and resist rotation of the floating nut 106 when the floating nut 106 is within the shell 104 in the first position. In addition, the grooves 170 resist axial movement of the retention washer 126 when the retention washer 126 is within shell 104.

Figure 12:
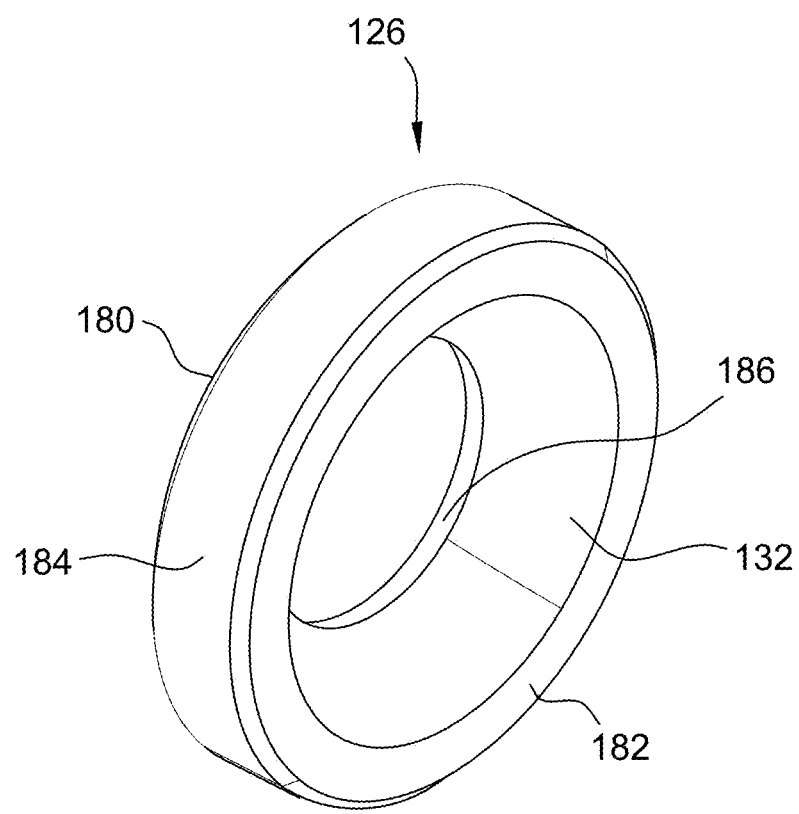
FIG. 12 is a perspective view of the retainer of the nut plate assembly.
Figure 13:
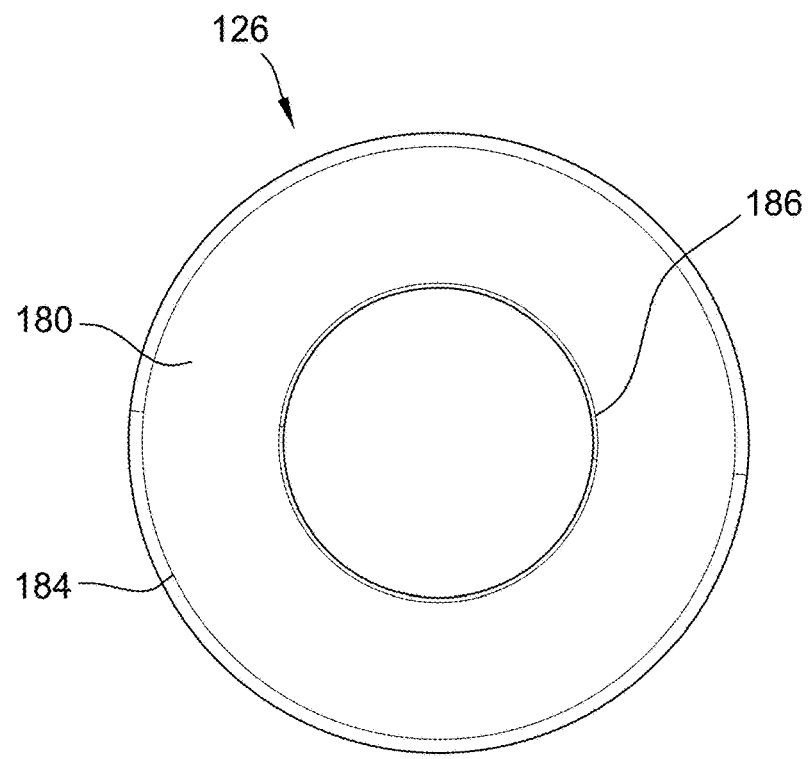
FIG. 13 is a bottom view of the retention washer.
Figure 14:
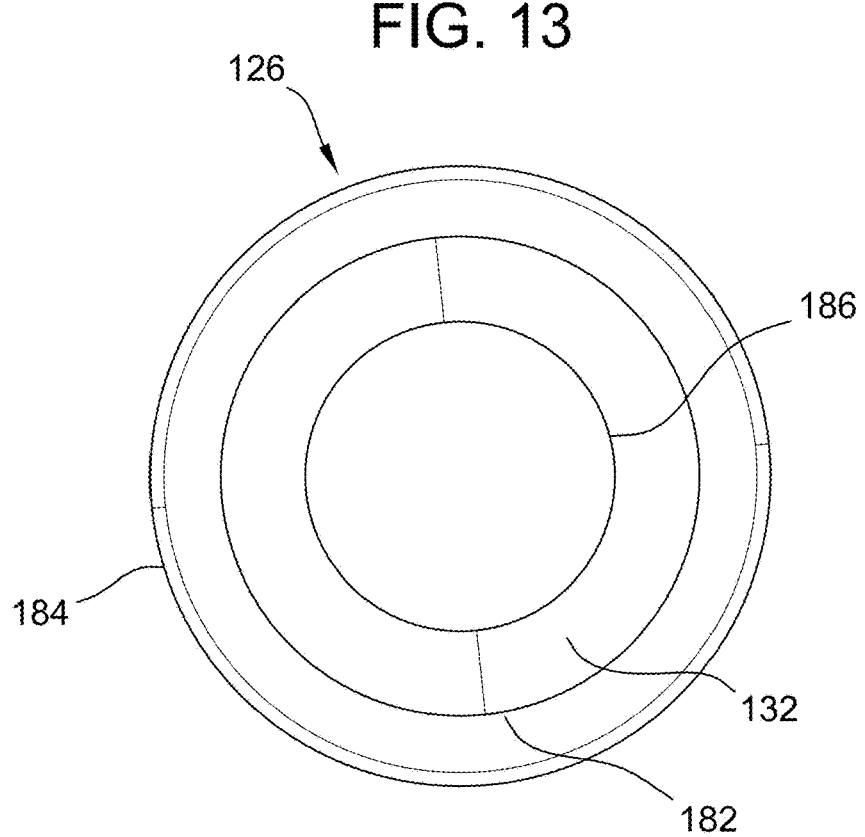
FIG. 14 is a top view of the retention washer.

Referring to FIGS. 12-14, in the example, the retention washer 126 includes a first annular wall 180, a second annular wall 182, an outer circumferential wall 184, an inner circumferential wall 186, and the second curved engagement surface 132. The outer circumferential wall 184 is cylindrical and extends between the first annular wall 180 and the second annular wall 182. The inner circumferential wall 186 and the second curved engagement surface 132 are spaced radially inward from the outer circumferential wall 184 and extend at least partly between the first annular wall 180 and the second annular wall 182. In particular, the inner circumferential wall 186 extends from the first annular wall 180 to the second curved engagement surface 132. The second curved engagement surface 132 extends from the inner circumferential wall 186 to the second annular wall 182.

The outer circumferential wall 184 extends along the center axis 134 throughout the entire thickness of the retention washer 126. The inner circumferential wall 186 extends along the center axis 134 throughout a portion of the thickness of the retention washer 126. In the example, the inner circumferential wall 186 forms a tapered region between the second engagement surface 132 and the first annular wall 180. The second curved engagement surface 132 is not parallel to the inner circumferential wall 186 or the outer circumferential wall 184. In the example, the second curved engagement surface 132 curves radially outward from the inner circumferential wall 186 toward the outer circumferential wall 184 to define a concave shape.

The retention washer 126 is arranged to engage the shell 104 and the floating nut 106 and facilitate the floating nut 106 extending at an angle relative to a panel surface when the nut plate assembly is installed on a panel. For example, the first annular wall 180 is planar and is arranged to engage a panel surface when the nut plate assembly 100 is secured to the panel. The second curved engagement surface 132 is not parallel to the first annular wall 180 (e.g., the second curved engagement surface 132 is curved relative to the first annular wall 180) and is arranged to receive the first curved engagement surface 130 of the floating nut 106 such that the floating nut 106 is tiltable relative to the surface and can extend at an angle relative to the surface when the nut plate assembly 100 is secured to the surface. For example, the angle between the floating nut 106 and the surface may be in a range of 1° to 10°.

To assemble the nut plate assembly 100, the bias member 108 is placed about the shoulder portion 158 of the floating nut 106 and the floating nut 106 is placed into the shell 104. The opening 124 of the shell 104 is aligned with the aperture 114 of the plate 102. The retention washer 126 is press fit into the cavity of the shell 104 such that the floating nut 106 is retained within the shell 104 and the bias member 108 is compressed within the shell 104.

Figure 17:
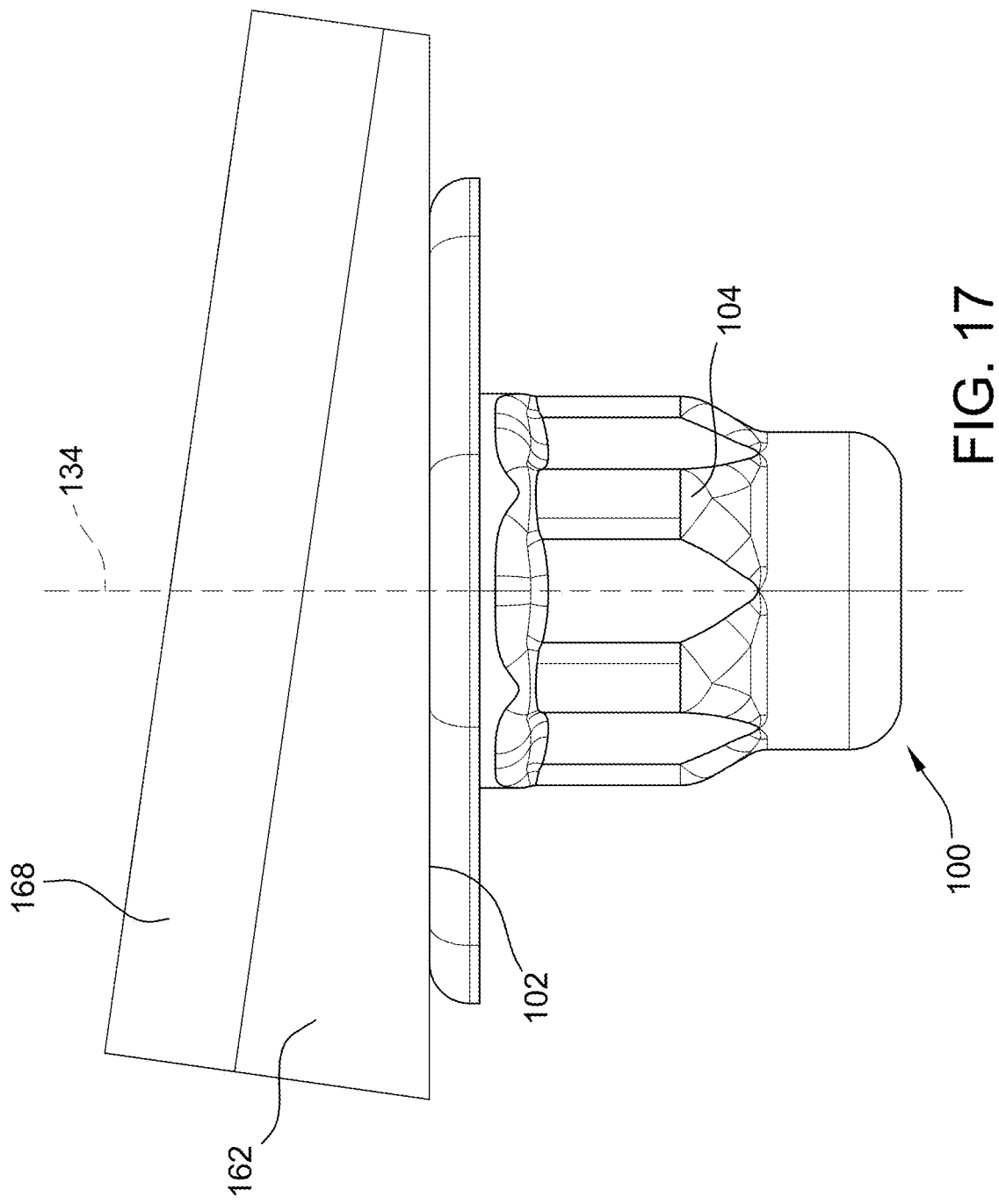
FIG. 17 is a side view of the nut plate assembly, coupled to a mounting structure and panel having non-parallel surfaces.
Figure 18:
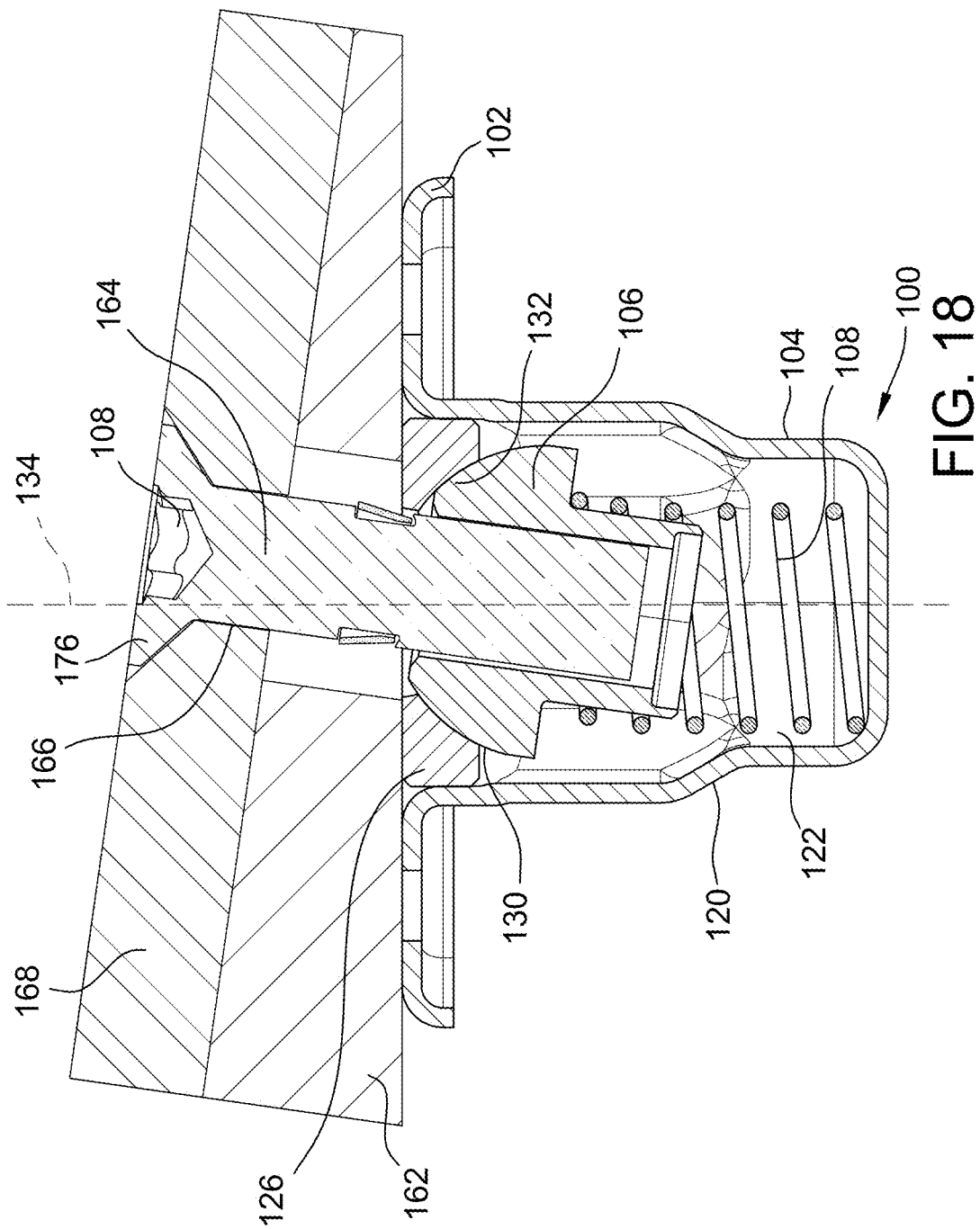
FIG. 18 is a cross-sectional view of the nut plate assembly coupled to the mounting structure and panel, and including a captive fastener.

FIG. 17 is a side view of the nut plate assembly 100 installed and used to couple a panel 168 to a mounting structure 162 via a captive fastener 164. FIG. 18 is a cross-sectional view of the nut plate assembly 100 secured to the mounting structure 162 and the panel 168. In the example, the nut plate assembly 100 is coupled to the mounting structure 162 by, for example, and without limitation, adhesive bonding. In another example, the nut plate assembly 100 is mechanically coupled to mounting structure 162 by fasteners such as, for example, and without limitation, nut and bolt combinations, sheet metal fasteners, rivets, and the like.

The mounting structure 162 includes an aperture 166 defined therethrough and sized to receive at least a portion of the fastener 164. The fastener 164 also extends through the panel 168 via the aperture 166. The nut plate assembly 100 is secured to the mounting structure 162 such that the aperture 114 of the plate 102 is aligned with the aperture 166 and the nut plate assembly 100 is arranged to receive the fastener 164 protruding from the aperture 166. In some examples, the nut plate assembly 100 includes, for example, and without limitation, a retaining ring, an E-clip, a spring plunger, and/or any mechanism configured to facilitate capturing the fastener 164 in the panel 168.

In the example, the fastener 164 is a panel bolt having a head 176. Alternatively, the fastener 164 is any type of fastener having head 176 taking any shape or form, including for example, and without limitation, a hexagonal head, a spline head, a flat head, a socket cap head, and a pan head. In some examples, the fastener 164 is a locking fastener, including one or more components configured to lock fastener 164 against rotation relative to panel 168.

The panel 168, with the fastener 164, is introduced to the mounting structure 162 with the nut plate assembly 100 secured on the mounting structure 162. The fastener 164 is aligned with the floating nut 106 and the panel 168 is pushed toward the mounting structure 162 until the fastener 164 contacts the threaded insert 152 of the floating nut 106. The bias member 108 biases the floating nut 106 toward the mounting structure 162 to facilitate engagement of the fastener 164 and the floating nut 106. The fastener 164 is threadably engaged with the floating nut 106 and rotated to secure the panel and the 168 and the mounting structure together.

As seen in FIGS. 17 and 18, the panel 168 and the mounting structure 162 include nonparallel surfaces which may be difficult to join together because of the angles. The nut plate assembly 100 facilitates joining the panel 168 and the mounting structure 162 because the floating nut 106 is supported on a curved interface. For example, the floating nut 106 is able to tilt relative to the retention washer 126 engaged with the panel 168 to receive the fastener 164 when the fastener 164 is coupled to the mounting structure 162 at an angle. The fastener 164 may extend at angles (e.g., perpendicular or obliquely) relative to the surface of the mounting structure 162 and perpendicular to the panel 168. The nut plate assembly 100 is able to receive the fastener 164 at multiple different angles to accommodate joining two non-parallel components and/or accommodate misalignment of the nut plate assembly 100 and the fastener 164.

Figure 19:
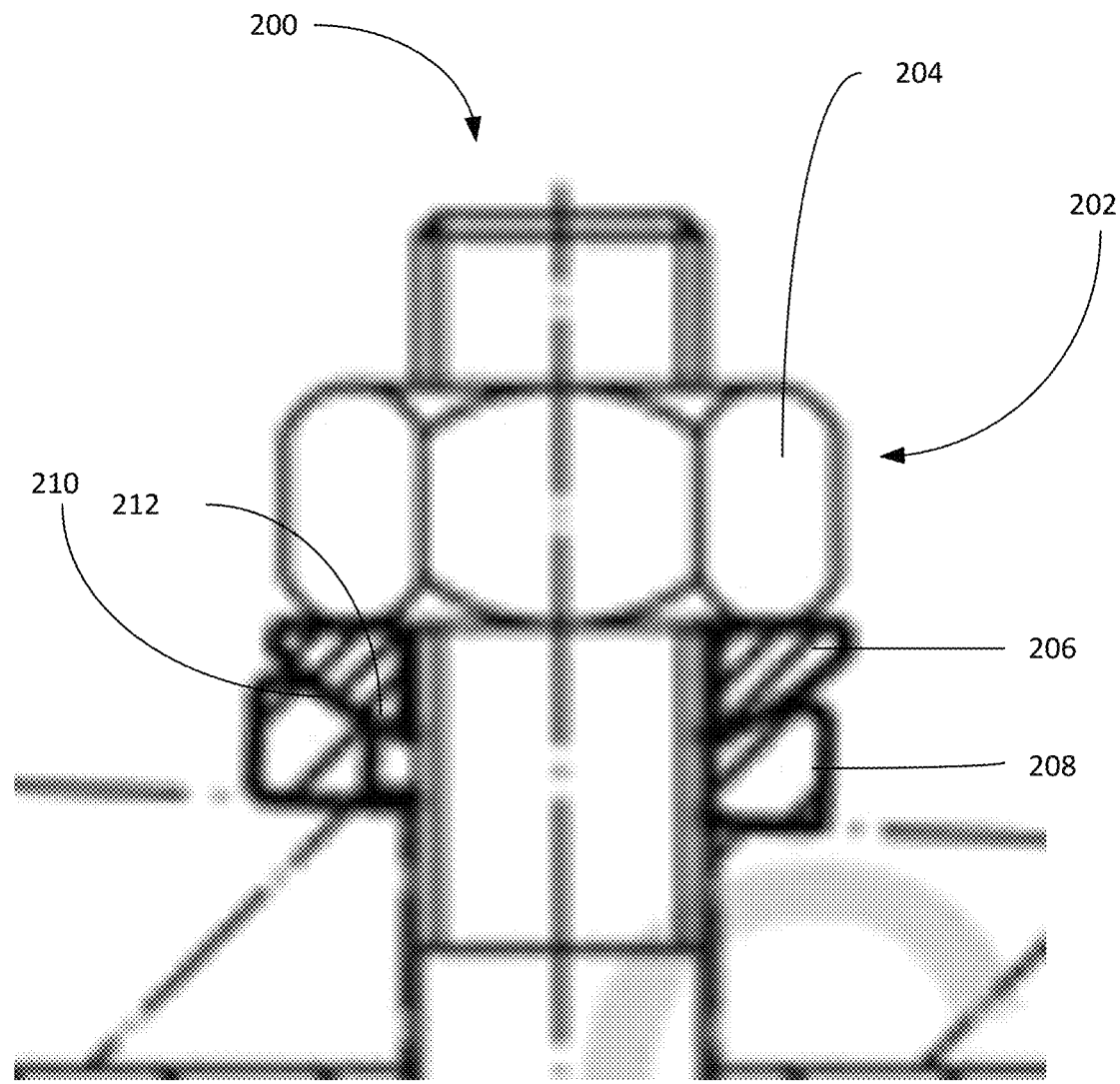
FIG. 19 is a cross-sectional view of an example of a nut plate assembly including a nut that is two pieces.

FIG. 19 is a cross-sectional view of an example of a nut plate assembly 200 including a nut 202 that is two pieces. For example, the nut 202 includes a body 204 and an intermediate washer 206. The body 140 is coupled to the intermediate washer 206 such that the body 140 and the intermediate 206 rotate and move together. The intermediate washer 206 engages a retention washer 208 at a curved interface. For example, a first curved engagement surface 210 is disposed on the intermediate washer 206 and engages a second curved engagement surface 212 on the retention washer 208.

The components as described herein provide spring-loaded nut plate assemblies. For example, as described in the embodiments herein, a floating nut of the nut plate assemblies is biased by a bias member, which enables the use of captive panel screws. This facilitates ease of assembly and disassembly of a panel to an underlying structure. In addition, the spring-loaded nut plate assemblies facilitate varying length captive panel fasteners. The bias member facilitates one of pulling the structure components together or pushing them apart during assembly or removal of the panel structure. In addition, the bias member facilitates preventing damage to the internal threads of the floating nut during installation of the fastener.

Examples of spring-loaded nut plate assemblies are described above. The systems and methods are not limited to the specific embodiments described herein, but rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A nut plate assembly comprising:
   a plate comprising an aperture defined therethrough;
   a shell coupled to the plate and extending along a center axis, and comprising a sidewall, a first end, and a second end;
   a compression spring disposed within the shell;
   a nut comprising a first curved engagement surface, the nut disposed within the shell and moveable between a first position proximate the first end of the shell and a second position proximate the second end of the shell, wherein the compression spring is positioned between the nut and the second end of the shell to provide an axial force to the nut and bias the nut in an axial direction toward one of the first position and the second position; and
   a retention washer positioned to retain the nut within the shell, the retention washer comprising a second curved engagement surface that receives the first curved engagement surface of the nut,
   wherein the first curved engagement surface of the nut and the second curved engagement surface of the retention washer form a curved interface, and wherein the nut is tiltable relative to the center axis when the nut is retained within the shell by the retention washer.

2. The nut plate assembly in accordance with claim 1, wherein the first curved engagement surface has a first radius and the second curved engagement surface has a second radius, wherein the second radius is larger than the first radius.

3. The nut plate assembly in accordance with claim 1, wherein the first curved engagement surface is convex and the second curved engagement surface is concave.

4. The nut plate assembly in accordance with claim 1, wherein the nut includes a first end, a second end, and a shoulder arranged to receive the compression spring.

5. The nut plate assembly in accordance with claim 4, wherein the first end of the nut includes the first curved engagement surface and defines a truncated spherical surface.

6. The nut plate assembly in accordance with claim 4, wherein the first curved engagement surface extends from the first end of the nut toward the shoulder and around an entire circumference of the nut.

7. The nut plate assembly in accordance with claim 1, wherein the retention washer includes a first annular wall, a second annular wall, an outer circumferential wall, and an inner circumferential wall, and wherein the second curved engagement surface extends from the inner circumferential wall to the second annular wall.

8. The nut plate assembly in accordance with claim 1, wherein the nut comprises a body and an intermediate washer coupled to the body, wherein the intermediate washer includes the first curved engagement surface.

9. The nut plate assembly in accordance with claim 1 further comprising a fastener extending through the plate and the nut, wherein the fastener is threadably engageable with the nut.

10. A method of assembling the nut plate assembly of claim 1, said method comprising:
positioning the compression spring within the shell, the shell extending along the center axis and having the sidewall, the first end joined to the plate, and the second end opposite the first end, the plate including the aperture defined therethrough;
positioning the nut within the shell, the nut moveable between a first position proximate the shell first end and a second position proximate the shell second end, wherein the compression spring is positioned to bias the nut toward one of the first position and the second position;
coupling the retention washer to at least one of the shell and the plate to retain the nut within the shell; and
engaging the first curved engagement surface of the nut with the second curved engagement surface of the retention washer, wherein the first curved engagement surface of the nut and the second curved engagement surface of the retention washer form a curved interface such that the nut is tiltable relative to the center axis when the nut is retained within the shell by the retention washer.

11. The method in accordance with claim 10, further comprising coupling the plate of the nut plate assembly to a mounting structure.

12. The method in accordance with claim 11, further comprising positioning a fastener extending through the mounting structure, the plate, and the nut, wherein the fastener is threadably engageable with the nut.

13. The method in accordance with claim 10, further comprising tilting the nut relative to the center axis by sliding the first curved engagement surface along the second curved engagement surface.

14. A fastener assembly comprising:
the nut plate assembly of claim 1; and
a fastener extending through the plate and the nut, wherein the fastener is threadably engageable with the nut,
wherein the nut is tiltable within the shell and relative to the center axis to engage the fastener if the fastener extends at an angle relative to the center axis.

15. The fastener assembly in accordance with claim 14, wherein the nut includes a first end, a second end, and a shoulder, wherein the first end of the nut includes the first curved engagement surface and defines a truncated spherical surface.

16. The fastener assembly in accordance with claim 15, wherein the first curved engagement surface extends from the first end of the nut toward the shoulder and around an entire circumference of the nut.

17. The fastener assembly in accordance with claim 14, further comprising a retention washer positioned to retain the nut within the shell, the retention washer comprising a second curved engagement surface that receives the first curved engagement surface of the nut.

18. The fastener assembly in accordance with claim 17, wherein the first curved engagement surface has a first radius and the second curved engagement surface has a second radius, wherein the second radius is larger than the first radius.

19. The fastener assembly in accordance with claim 17, wherein the retention washer includes a first annular wall, a second annular wall, an outer circumferential wall, and an inner circumferential wall, and wherein the second curved engagement surface extends from the inner circumferential wall to the second annular wall.

20. The fastener assembly in accordance with claim 19, wherein the outer circumferential wall is cylindrical and extends between the first annular wall and the second annular wall, and wherein the inner circumferential wall and the second curved engagement surface are spaced radially inward from the outer circumferential wall and extend between the first annular wall and the second annular wall.

* * * * *